United States Patent
Riley

(10) Patent No.: US 9,441,985 B2
(45) Date of Patent: Sep. 13, 2016

(54) FUTURE SCENE GENERATING SYSTEM, DEVICE, AND METHOD FOR A REMOTELY-OPERATED VEHICLE

(75) Inventor: Mitchell A. Riley, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 13/557,427

(22) Filed: Jul. 25, 2012

(65) Prior Publication Data

US 2014/0032013 A1 Jan. 30, 2014

(51) Int. Cl.
*G01C 23/00* (2006.01)

(52) U.S. Cl.
CPC .................................... *G01C 23/00* (2013.01)

(58) Field of Classification Search
CPC ...................................................... G01C 23/00
USPC .......................................... 701/2, 3; 434/37
See application file for complete search history.

(56) References Cited

U.S. PATENT DOCUMENTS

| | | | |
|---|---|---|---|
| 5,904,724 A * | 5/1999 | Margolin | G05D 1/0038 244/189 |
| 2007/0244608 A1* | 10/2007 | Rath et al. | 701/3 |
| 2008/0206719 A1* | 8/2008 | Johnsson et al. | 434/37 |
| 2009/0076665 A1* | 3/2009 | Hoisington | G05D 1/0044 701/2 |
| 2011/0066262 A1* | 3/2011 | Kelly | G05B 23/0267 700/90 |
| 2011/0071703 A1* | 3/2011 | Schoettl | 701/2 |

* cited by examiner

*Primary Examiner* — Aaron L Troost
(74) *Attorney, Agent, or Firm* — Daniel M. Barbieri; Donna P. Suchy; Angel N. Gerdzhikov

(57) ABSTRACT

A present novel and non-trivial system, device, and method for generating a future scene of a remotely-operated vehicle ("ROV") are disclosed. A future scene generator ("FSG") may receive remote navigation data from the ROV; receive engine control and steering control ("ECSC") data representative of engine and steering commands; predict future navigation data based upon the remote navigation data, the ECSC data, and a time delay; retrieve object data corresponding to the future navigation data; generate an image data set based upon the future navigation data and the object data, where the image data set is representative of an image of a future scene located outside the remote vehicle; and provide the image data set to a display unit. If the ROV is an unmanned aerial vehicle, the ECSC data could be engine control and flight controls data, and the image of a future scene could be a three-dimensional perspective.

20 Claims, 14 Drawing Sheets

FIG. 3A   Attitude: Straight-and-Level   Altitude: 6,000 feet
          Heading: 310 Degrees            Speed: 200 knots FIG. 3D  T = t(i)
Control Input = Right 25 Degrees Bank
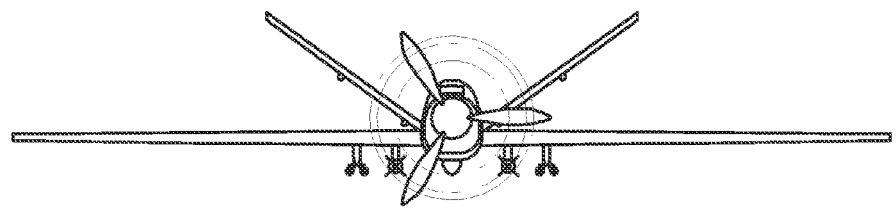
FIG. 3E
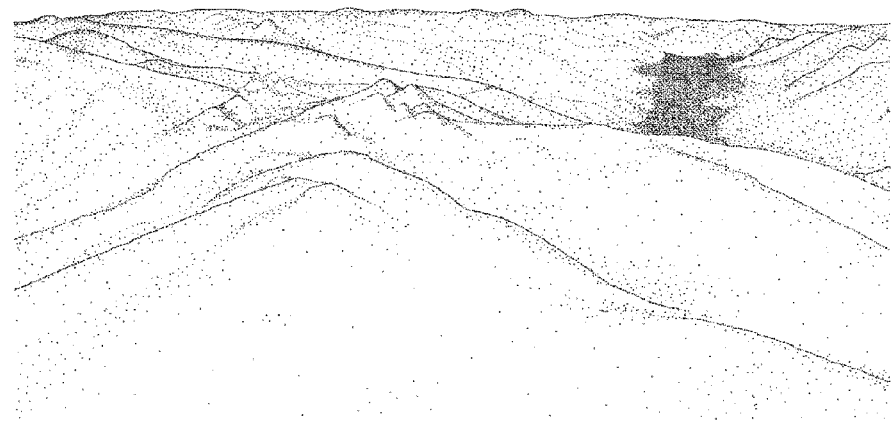
FIG. 3F
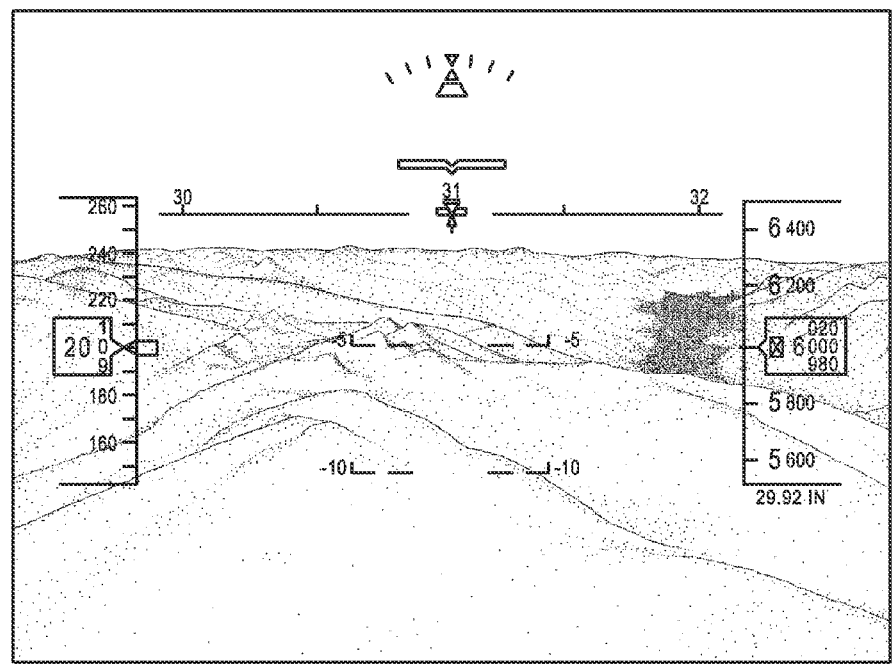

FIG. 3G  T = t(i) + t(d)
Control Input = Right 25 Degrees Bank
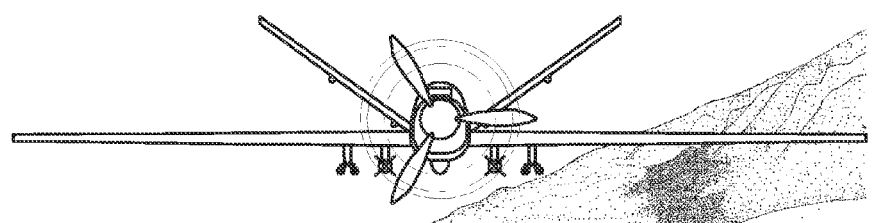
FIG. 3H
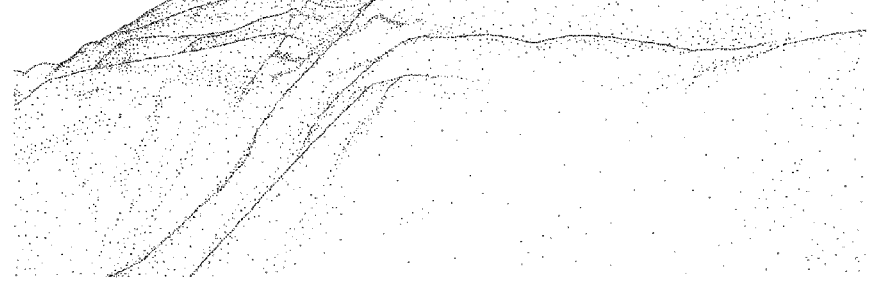
FIG. 3I
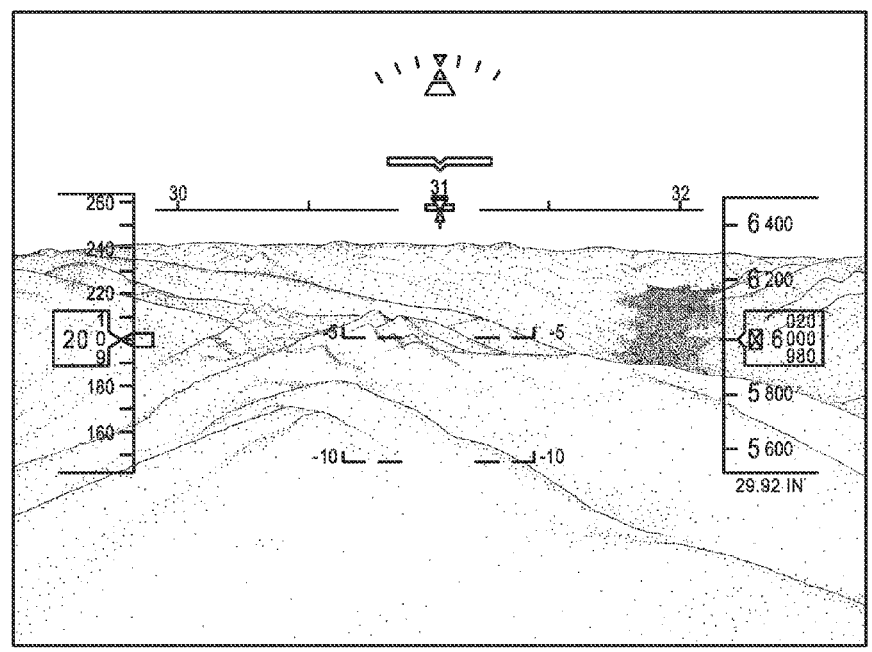

FIG. 3J   T = t(i) + 2t(d)
Control Input = Right 25 Degrees Bank

FIG. 3M  T = t(i) + 3t(d)
Control Input = 0 Degrees Bank

FIG. 3P  $T = t(i) + 4t(d)$
Control Input = 0 Degrees Bank

FIG. 3S    T = t(i) + 5t(d)
Control Input = 0 Degrees Bank

FIG. 4A  T = t(i)
Control Input = Right 25 Degrees Bank

FIG. 4D
T = t(i) + t(d)
Control Input = Right 25 Degrees Bank
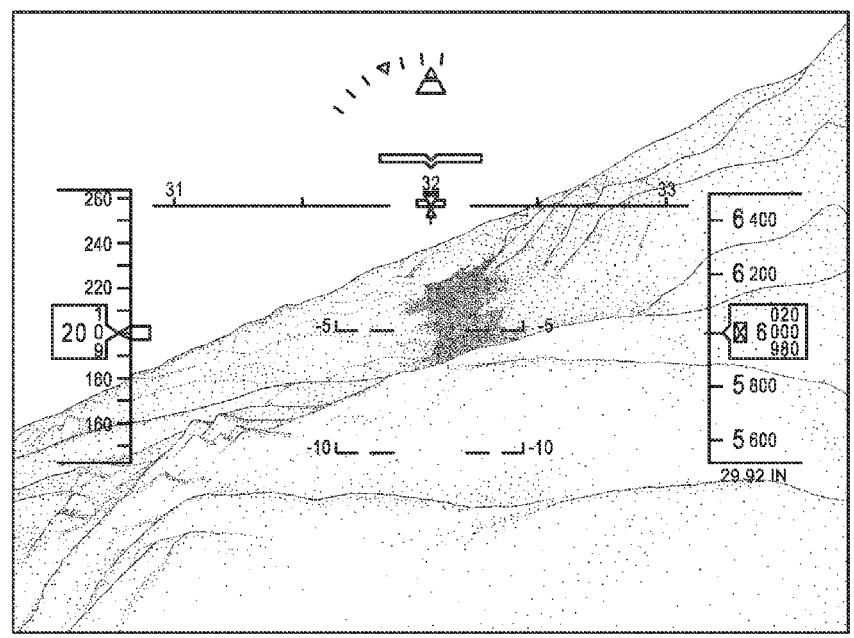
FIG. 4E
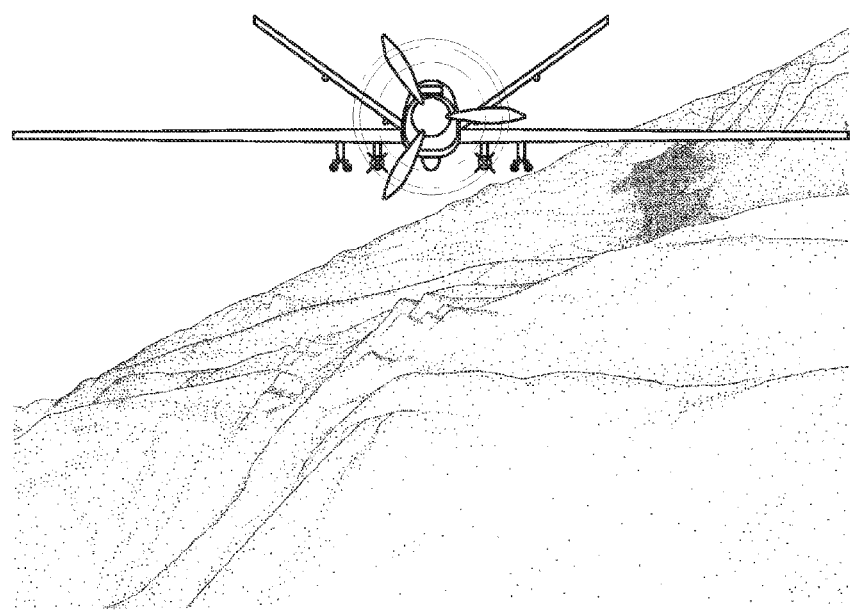
FIG. 4F FIG. 4G  T = t(i) + 2t(d)
Control Input = Right 25 Degrees Bank FIG. 4J  
T = t(i) + 3t(d)  
Control Input = 0 Degrees Bank
FIG. 4K
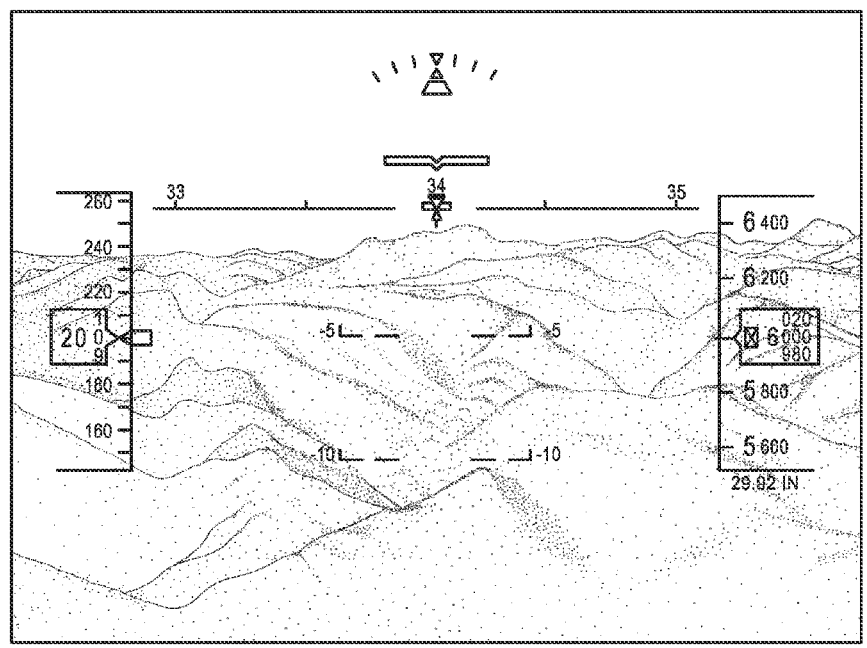
FIG. 4L
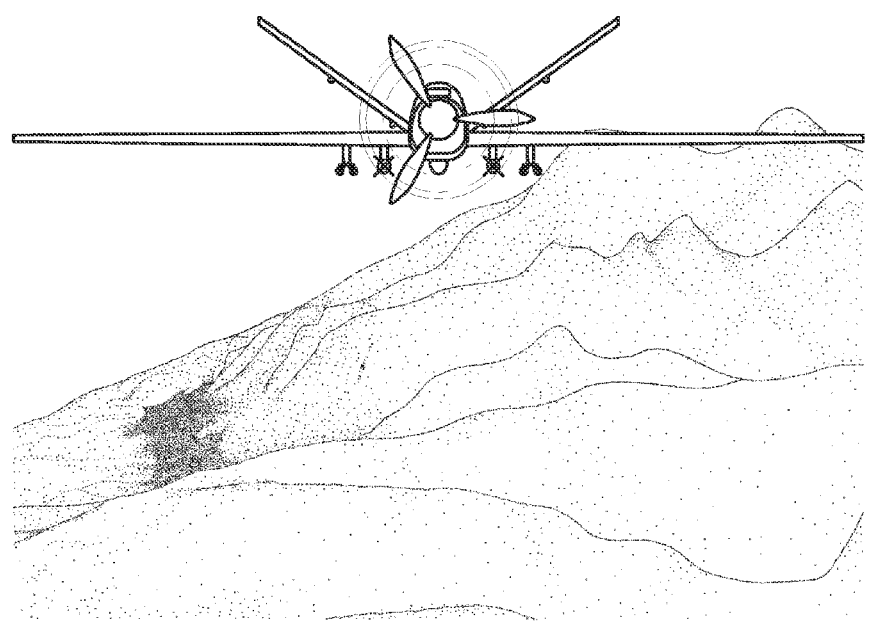

FIG. 4M    $T = t(i) + 4t(d)$
Control Input = 0 Degrees Bank

FUTURE SCENE GENERATING SYSTEM, DEVICE, AND METHOD FOR A REMOTELY-OPERATED VEHICLE

BACKGROUND OF THE INVENTION

1. Field of the Invention

This invention pertains generally to the field of vehicles display units such as an aircraft display unit that provide information to the vehicle operator such as a pilot of an aircraft.

2. Description of the Related Art

A remotely-operate vehicle such as an unmanned aerial vehicle ("UAV") presents unique problems to those who operate the vehicle via a communications network. For a pilot flying the UAV located on the other side of the Earth and a communications network comprised of multiple satellites, a communication time delay of at least two seconds or more is not uncommon; occasionally, the time delay could be more than five seconds.

To adapt to this challenge, pilots have been known to plot a trail "breadcrumbs" ahead of the UAV as a means of flying the UAV. Analogous to a flight plan comprised of waypoints, a manual selection of breadcrumbs on an electronic map may be used to navigate the UAV to its desired location. Data representative of the breadcrumbs (i.e., waypoints) may be transmitted to the UAV via the network which, upon receipt, may track the flight plan comprised of the breadcrumbs with the assistance of a navigation system, a flight management system ("FMS"), and/or autopilot. The FMS may monitor the flight along the flight plan, receive current latitude/longitude information from the navigation system, and issue commands to the autopilot to maintain the UAV's flight along the flight plan.

Besides flying along the flight path, feedback of the flight's progress may be provided to the pilot via the network through the use of position reports and video images. Because of the time delay, however, the position of the UAV is a past position, and the scene outside the UAV shown in the video images is a past scene. Manually flying a UAV based upon past positions and past scenes presents a challenge to a pilot because he or she may have to anticipate ahead of schedule when to begin a maneuver, estimate how much flight control input is needed to perform the maneuver, and anticipate ahead of schedule when to complete the maneuver.

Manually flying an aircraft by anticipation and estimation is not typical of the flying skills learned by a pilot through years of pilot training and flight experience. Instead, the pilot learns that the aircraft typically reacts immediately to changes of flight control input. That is, the pilot is used to seeing an immediate change of the scene outside the aircraft when he or she performs a maneuver. The presence of the inherent time delay when flying a UAV is not conducive to a pilot's normal application of flying skills because an action of the pilot does not lead to an immediate reaction of the UAV.

BRIEF SUMMARY OF THE INVENTION

The embodiments disclosed herein present at least one novel and non-trivial system, device, and method for generating a future scene of a remotely-operated vehicle ("ROV"). With the embodiments disclosed herein, an operator may observe an immediate change in the scene as presented on a display unit when the operator controls the ROV although the reaction of the ROV is not immediate.

In one embodiment, a system is disclosed for generating a future scene of an ROV. The system may be comprised of an ROV, a manual input device, a datalink configured to receive a remote navigation signal, one or more sources of engine control and steering control ("ECSC") data, a source of object data, a future scene generator ("FSG"), and a display unit. Additionally, the system could include one or more vehicle systems and/or an operator station that could be a fixed or mobile ground station, an aerial station, or a nautical station.

In another embodiment, a device such as an FSG is disclosed for generating a future scene of an ROV. This device may be configured to generate an image data set based upon the future navigation data and the object data. The image data set could be representative of an image of a future scene located outside the ROV. If the ROV is a UAV, the image of a future scene located outside the UAV is a three-dimensional perspective.

In another embodiment, a method is disclosed for generating a future scene of an ROV, where the method could be performed by the FSG. When properly configured, the FSG may receive the remote navigation data of an ROV; receive ECSC data representative of engine and steering commands; predict future navigation data as a function of the remote navigation data, the ECSC data, and a time delay; retrieve object data corresponding to the future navigation data; generate an image data set based upon the future navigation data and the object data, and provide the image data set to a display unit.

BRIEF DESCRIPTION OF THE DRAWINGS

FIGS. 3A through 3C present a first real-time input of flight controls, a first real-time scene outside the ROV, and a first time-delayed, three-dimensional synthetic vision image of a past scene outside the ROV.

FIGS. 3D through 3F present a second real-time input of flight controls, a second real-time scene outside the ROV, and a second time-delayed, three-dimensional synthetic vision image of a past scene outside the ROV.

FIGS. 3G through 3I present a third real-time input of flight controls, a third real-time scene outside the ROV, and a third time-delayed, three-dimensional synthetic vision image of a past scene outside the ROV.

FIGS. 3J through 3L present a fourth real-time input of flight controls, a fourth real-time scene outside the ROV, and a fourth time-delayed, three-dimensional synthetic vision image of a past scene outside the ROV.

FIGS. 3M through 3O present a fifth real-time input of flight controls, a fifth real-time scene outside the ROV, and a fifth time-delayed, three-dimensional synthetic vision image of a past scene outside the ROV.

FIGS. 3P through 3R present a sixth real-time input of flight controls, a sixth real-time scene outside the ROV, and a sixth time-delayed, three-dimensional synthetic vision image of a past scene outside the ROV.

FIGS. 3S through 3U present a seventh real-time input of flight controls, a seventh real-time scene outside the ROV, and a seventh time-delayed, three-dimensional synthetic vision image of a past scene outside the ROV, FIGS. 4A through 4C present a first real-time input of flight controls, a first three-dimensional synthetic vision image of a future scene outside the ROV, and a first real-time scene outside the ROV.

FIGS. 4D through 4F present a second real-time input of flight controls, a second three-dimensional synthetic vision image of a future scene outside the ROV, and a second real-time scene outside the ROV.

FIGS. 4G through 4I present a third real-time input of flight controls, a third three-dimensional synthetic vision image of a future scene outside the ROV, and a third real-time scene outside the ROV.

FIGS. 4J through 4L present a fourth real-time input of flight controls, a fourth three-dimensional synthetic vision image of a future scene outside the ROV, and a fourth real-time scene outside the ROV.

FIGS. 4M through 4O present a fifth real-time input of flight controls, a fifth three-dimensional synthetic vision image of a future scene outside the ROV, and a fifth real-time scene outside the ROV.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
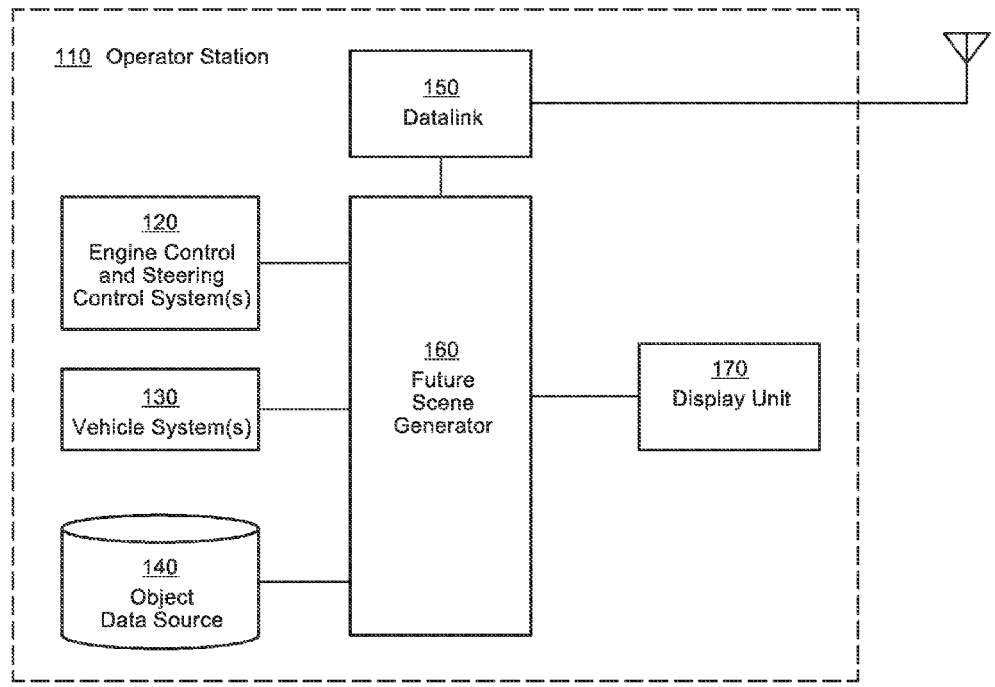
FIG. 1 depicts a block diagram of a future scene generation system.

FIG. 1 depicts a block diagram of a future scene generation system 100 suitable for implementation of the techniques described herein. The future scene generation system 100 of an embodiment of FIG. 1 includes an operator station 110 comprised of an engine control and steering control system(s) ("ECSCS") 120, an object data source 140, a datalink 150, a future scene generator ("FSG") 160, a display unit 170, a remotely-operated vehicle 180, and a communications network in which signals are transmitted bi-directionally between the operator station 110 and the remotely-operated vehicle 180. Additionally, the operator station 110 could be comprised of a vehicle system 130.

Figure 2:
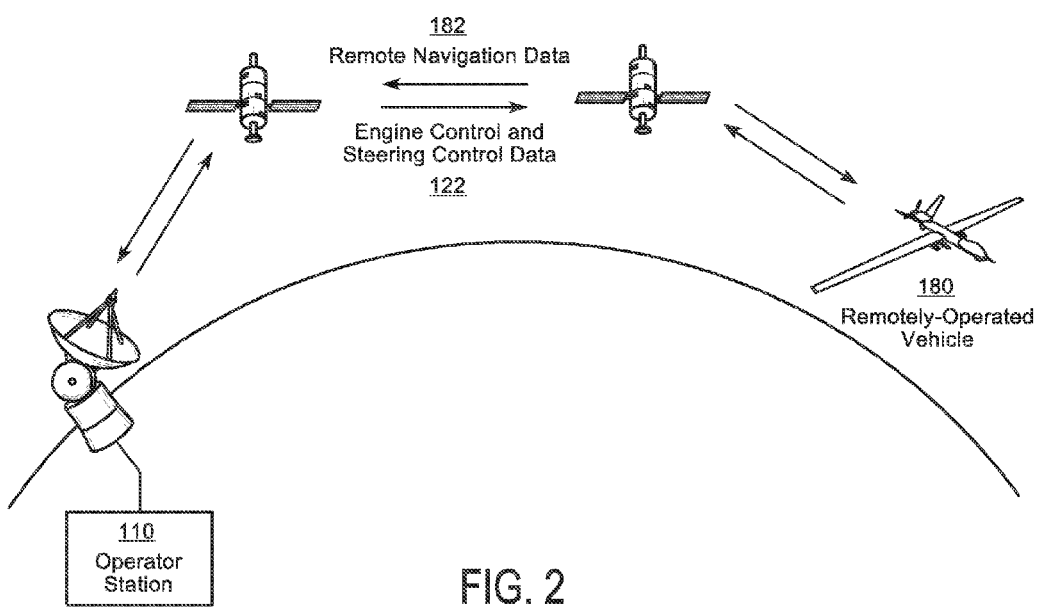
FIG. 2 depicts a exemplar of a communications system

In an embodiment of FIG. 2, the communications network comprised of the operator station 110, the ROV 180, and two satellites is depicted for the sole purpose of illustrating a network in which ECSC data ("ECSC data") 122 and remote navigation data 182 may be transmitted between the operator station 110 and the ROV 180. Although satellites are depicted, the network though which signals are transmitted could be comprised of a ground-based network or a combined ground-based, satellite-based network.

It should be noted that, although the discussion herein will be drawn to the remotely-operated vehicle 180 comprised of an unmanned aerial vehicle ("UAV"), it is not limited to the UAV. Instead, the ROV 180 could include any ground and/or nautical, manned or unmanned vehicle capable of being operated remotely and configured to receive ECSC data 122 and to transmit signals representative of remote navigation data 182. It should be further noted that data, as embodied herein for any source or system, could be comprised of any analog or digital signal, either discrete or continuous, which could contain information. As embodied herein, data and signals are treated synonymously.

Returning to FIG. 1, the operator station 110 could be comprised of any station from which an operator such as a pilot may remotely fly the ROV 180. As one embodiment herein, the operator station 110 could be a fixed or mobile ground station. In another embodiment, the operator station 110 could be a nautical or aerial station.

In an embodiment of FIG. 1, the ECSCS 120 could be comprised of one or more sources configured to provide ECSC data 122 representative of engine control and steering commands. The engine control data could be representative of engine control commands for each engine and originate from a manual control device (e.g., throttle) used by a pilot to set the speed of an engine(s), an automated engine control device (e.g., auto-throttle system) engaged by the pilot, or both. For a ground vehicle, the engine commands could originate from an accelerator device.

The steering control data could be representative of steering control commands originating from a manual control device (e.g., control stick, control wheel, etc. . . . ) used by a pilot to fly the ROV 180. The steering control data could be representative of a measurement of surface travel of primary and/or secondary control surfaces, where the amount of surface travel could depend upon the pilot's input of the manual control device and/or automated input received from an autopilot. Primary flight control surfaces could be comprised of ailerons, elevator(s), and rudder(s); secondary flight control surfaces could be comprised of, but not limited to, flaps, slats, spoilers, and/or speed brakes.

In an embodiment of FIG. 1, the vehicle system 130 could be comprised of one or more systems of the ROV 180 other than the ECSCS 120 that may be controlled from the operator station 110. Examples of the vehicle system 130 could include, but are not limited to, fuel system, hydraulics system, missile system, and/or landing gear system. As discussed below, the vehicle system 130 could be a source of one or more aircraft performance factors used in the prediction of future navigation data.

In an embodiment of FIG. 1, the object data source 140 could be comprised one or more sources of terrain data and/or surface feature data. The object data source 140 could be comprised of, but is not limited to, a terrain database configured to store terrain data contained in digital elevation models ("DEM"). Generally, the terrain data of a DEM are stored as grids, and each grid represents an area of terrain and is commonly referred to as a terrain cell. The object data source 140 could be a database configured to store data representative of surface features such as, but not limited to, obstacles, buildings, lakes and rivers, and paved or unpaved surfaces. The object data source 140 is a data source known to those skilled in the art.

The datalink 150 could be comprised of any system(s) through which signal(s) representative of ECSC data 122 and remote navigation data 182 may be transmitted and received, respectively. Although not shown in FIG. 1, a datalink could be installed in the ROV 180 to facilitate the transmission and receipt of remote navigation data 182 and ECSC data 122, respectively. The datalink 150 is a system known to those skilled in the art.

In an embodiment of FIG. 1, the FSG 160 may be any electronic data processing unit which executes software or source code stored, permanently or temporarily, in a digital memory storage device as discussed above. The FSG 160 may be driven by the execution of software or source code containing algorithms developed for the specific functions embodied herein. Common examples of electronic data processing units are microprocessors, Digital Signal Processors, Programmable Logic Devices, Programmable Gate Arrays, and signal generators; however, for the embodiments herein, the term generator is not limited to such processing units and its meaning is not intended to be construed narrowly. For instance, a processor could also consist of more than one electronic data processing units. As embodied herein, the FSG 160 could be a processor(s) used by or in conjunction with any other system of the operator station 110.

The FSG 160 may be programmed or configured to receive as input data from the ECSCS 120, the vehicle system 130, the object data source 140, and the datalink 150. As embodied herein, the terms "programmed" and "configured" are synonymous with respect to the execution of software or source code developed for the specific functions and methods embodied herein. The FSG 160 may be electronically coupled to systems and/or sources to facilitate the receipt of input data; as embodied herein, operatively coupled may be considered as interchangeable with electronically coupled. The FSG 160 may be programmed to execute the method(s) embodied herein and discussed in detail below. The FSG 160 may be programmed to provide output data and/or signal data to the datalink 150 and the display unit 170. It is not necessary that a direct connection be made with the FSG 160; instead, the receiving of input data and the providing of output data could be provided through a data bus or through a wireless network.

In an embodiment of FIG. 1, the display unit 170 could be comprised of any unit on which the operator may view flight information of the ROV 180 such as, for example, a three-dimensional scene outside the ROV 180 and/or symbology representative of flight information such as speed, altitude, and heading. The display unit 170 could be comprised of both portable or non-portable devices such as, but not limited to, tablet devices (e.g., an iPad developed by Apple, Inc., devices in which an Android operating system developed by Google Inc. is installed, etc. . . . ), electronic flight bags, smartphones, laptop computers, and/or desktop computers irrespective of location (i.e., internal or external to the operator station 110) with which the FSG 160 is in communication. As embodied herein, the display unit 170 may receive an image data set generated by the FSG 160 using the method(s) disclosed herein.

Moreover, the screen of the display unit 170 could be comprised of a touch screen on which the operator may interact with a graphical user interface ("GUI") if such GUI is included in the image presented on the display unit 170. The display unit 170 could employ touch screen technologies such as, but not limited to, beam interrupt, resistive, projected capacitive, and/or surface acoustic wave technologies. As embodied herein, the display unit 170 may provide input data to the FSG 160 as necessary.

In an embodiment of FIG. 1, the ROV 180 could include any ground and/or nautical, manned or unmanned vehicle capable of being operated remotely and configured to receive ECSC data 122 and to transmit signals representative of the remote navigation data 182. The ROV 180 could be configured with a navigation system configured to provide the remote navigation data 182 and comprised of, but is not limited to, an air/data system, an attitude heading reference system, an inertial guidance system (or inertial reference system), a global navigation satellite system ("GNSS") (or satellite navigation system), and/or a flight management computing system, all of which are known to those skilled in the art. For the purposes of the embodiments herein, a radio altimeter system may be included in the navigation system; a radio altimeter system is known to those skilled in the art for determining the altitude above the surface over which the ROV 180 is currently operating.

As embodied herein, a navigation system could be a source for providing the remote navigation data 182 of the ROV 180 including, but not limited to, geographic position, altitude, attitude, speed, vertical speed, direction of travel (e.g., heading), radio altitude, day/date/time and data quality. As embodied herein, aircraft position could be comprised of geographic position (e.g., latitude and longitude coordinates) and altitude, and direction may be derived from either geographic position, aircraft position, or both. Also, aircraft orientation may include pitch, roll, and/or heading information related to the attitude of the aircraft. As embodied herein, data from the navigation system may be transmitted from the ROV 180 to the datalink 150 via a communication network.

Figure 3B:
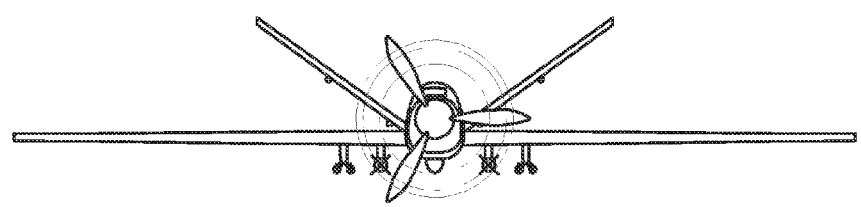
Figure 3B:
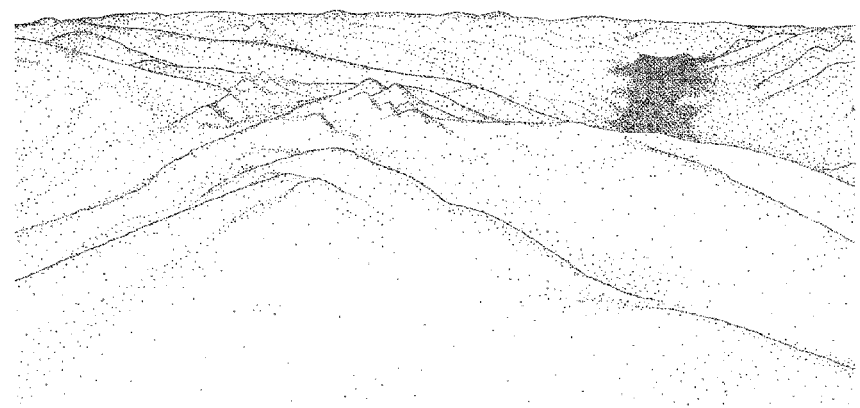
Figure 3C:
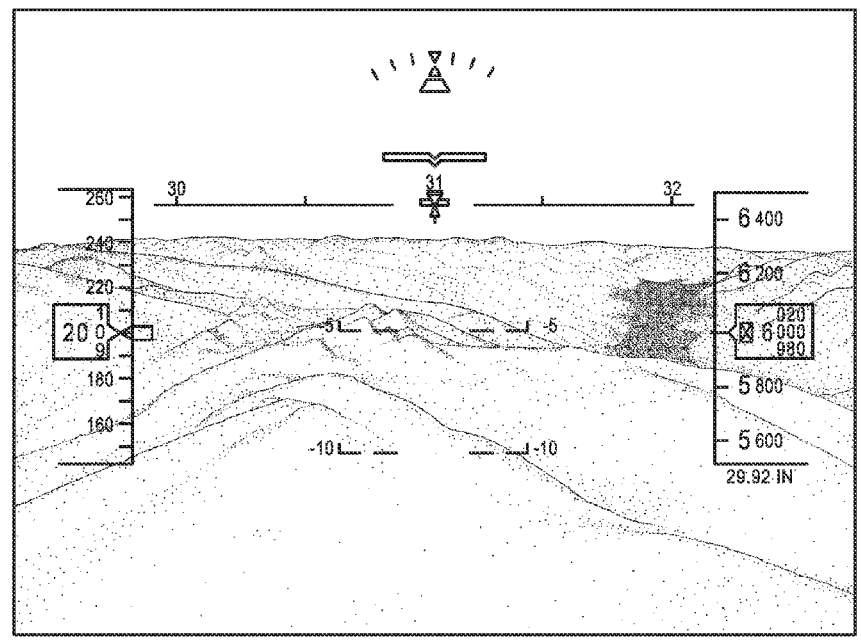
Figure 3K:
Figure 3L:
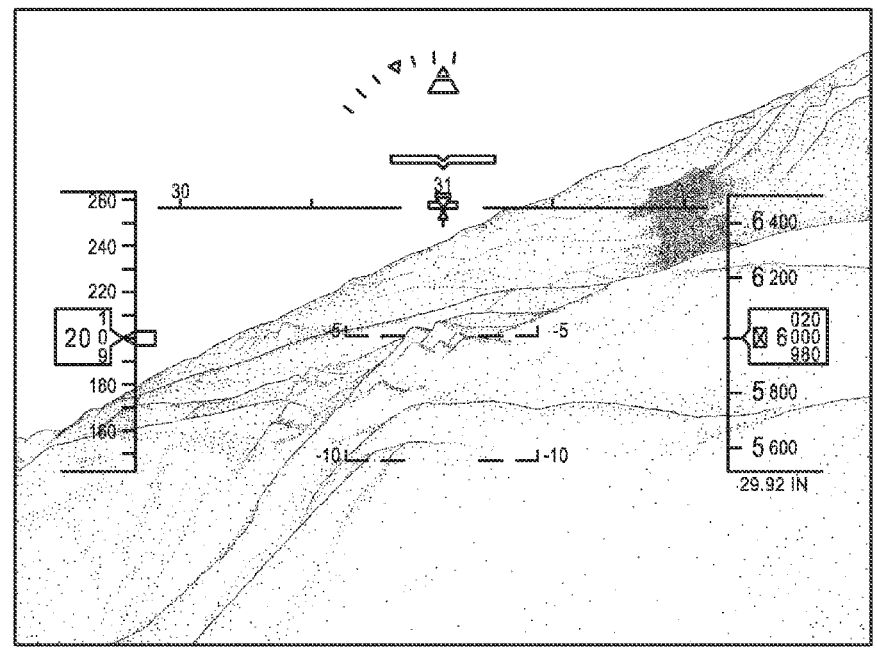
Figure 3N:
Figure 3O:
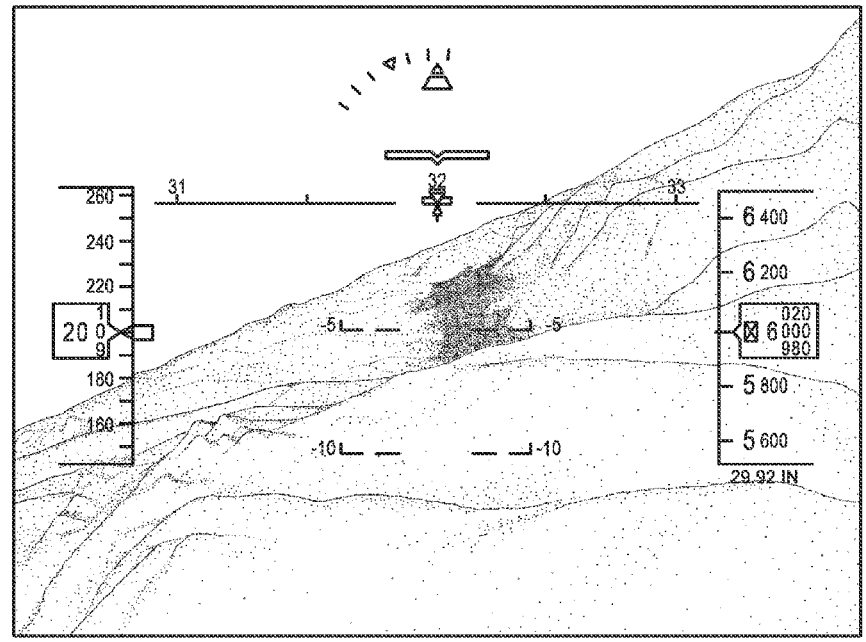
Figure 3Q:
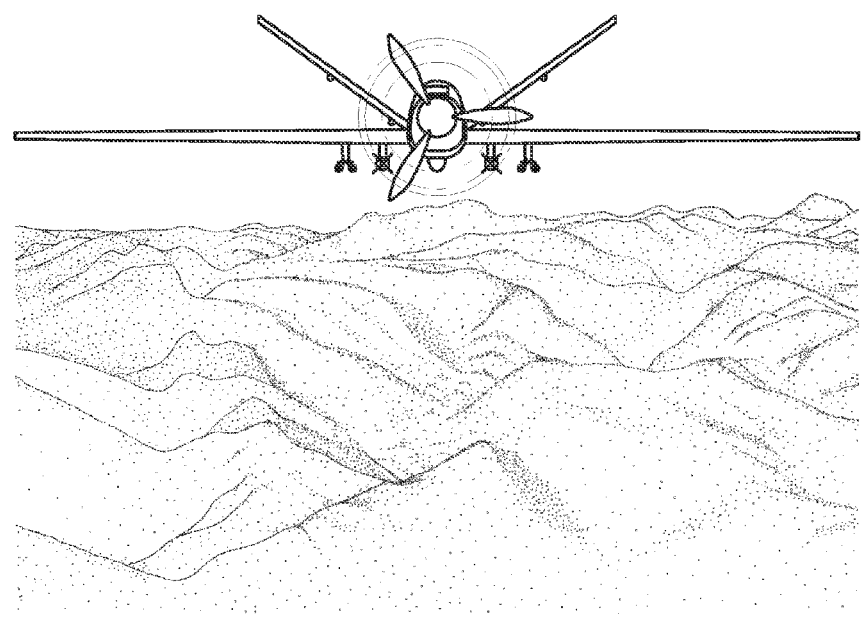
Figure 3R:
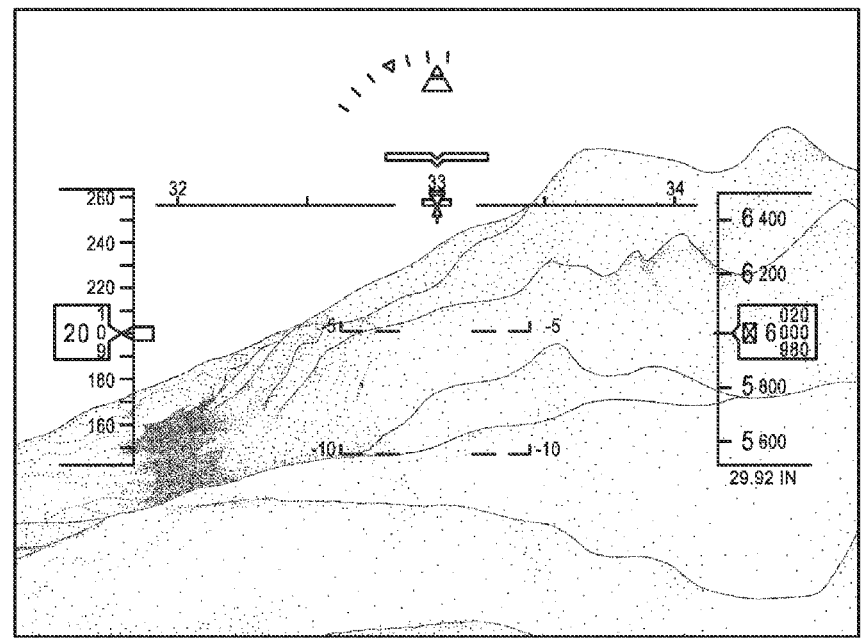
Figure 3T:
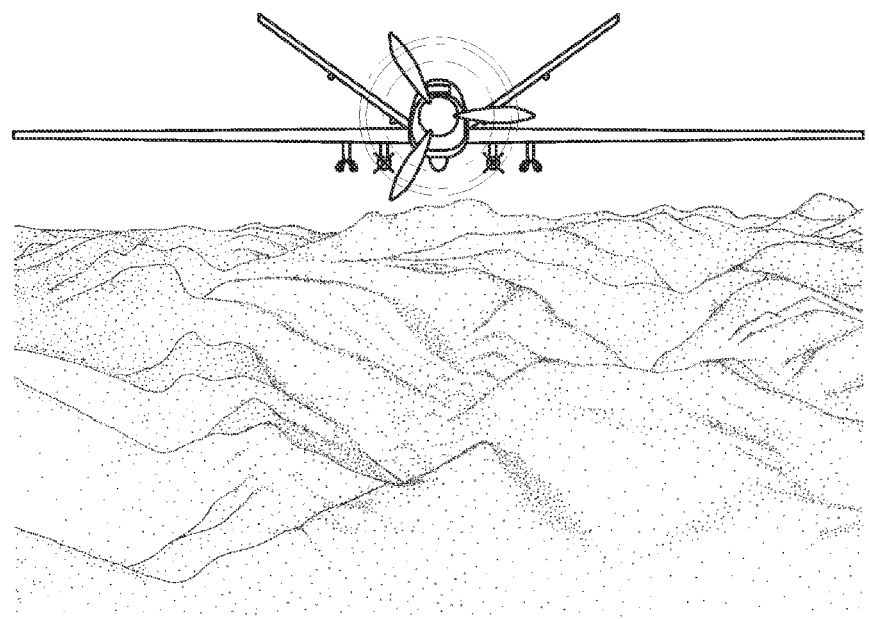
Figure 3U:
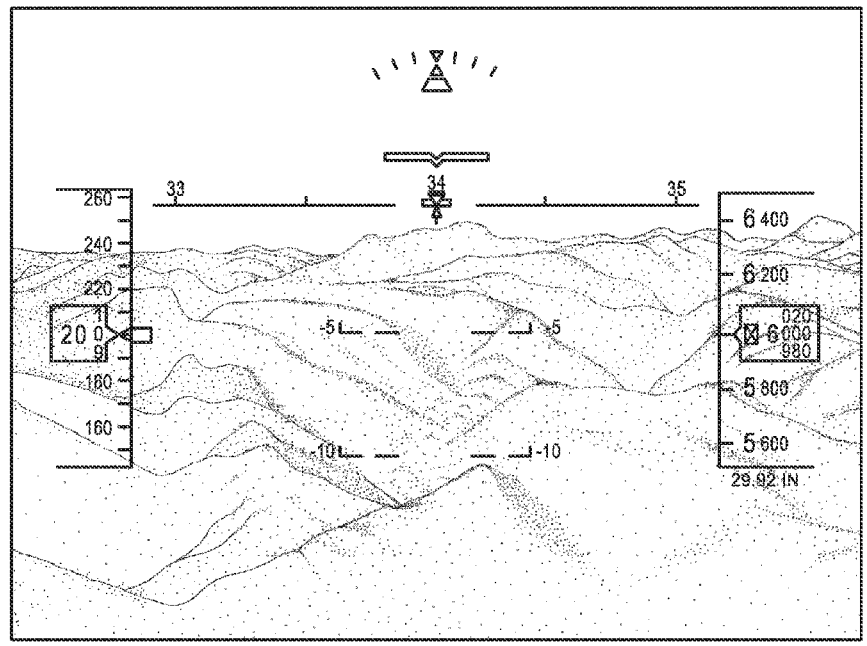

Before the advantages and benefits of the embodiments disclosed herein are discussed, FIGS. 3A through 3U are presented to illustrate the effects of the time delay when flying a remotely-piloted vehicle. Referring to FIG. 3A, assume that the pilot has placed the ROV 180 in the following scenario: straight-and-level flight, a heading of 310 degrees, an altitude of 6,000 feet, and a speed of 200 nautical miles per hour ("knots"). Also, assume that the actual scene shown in FIG. 3B is one looking forward from behind the ROV; that is, the tail of the ROV in the scene is closer than the nose. Because the ROV 180 may have a navigation system installed, the remote navigation data 182 of the ROV 180 may be generated, transmitted to the pilot station 110 via its datalink and the communications network discussed above, and provided to the FSG 160 via the datalink 150.

Based upon the navigation information comprised of the position and heading that is represented in the remote navigation data 182, the FSG 160 could be programmed to retrieve terrain data from the terrain database 140 corresponding to the navigation information and generate synthetic image data representative of the scene outside the ROV 180 using technique(s) known to those skilled in the art. When the symbology data representative of the navigation information is added or overlaid to the synthetic image data, the scene outside the ROV 180 and the navigation symbology corresponding to the scene may be presented on the screen of the display unit 170 as shown in FIG. 3C; the technique(s) of generating and overlaying symbology data is known to those skilled in the art. Due to the time delay associated with the transmission of the remote navigation data, the scene being presented in not an instant scene outside the ROV 180 being experienced at the instant time (i.e., current time); instead, it is a past scene at the time when the remote navigation data 182 was generated.

Referring to FIG. 3D, assume that the pilot wishes to change heading to 340 degrees and has moved the manual control device (e.g., control stick, control wheel, etc. . . . ) in a position that places the ROV 180 into a level right turn at bank angle of 25 degrees at an initial time t(i). In response to pilot's action, the ECSCS 120 generates ECSC data 122 representative of 25 degree right turn that is ultimately transmitted to the ROV 180 through the communication system using techniques known to those skilled in the art; it should be noted that, although the remaining discussion will be drawn to flight controls, the embodiments herein could include changes to the engine controls. Due to the time delay, the ROV 180 has not received the ECSC data 122 at t(i); as indicated in FIG. 3E, there has been no change in the flight attitude from FIG. 3B. The remote navigation data 182 representative of the flight attitude at t(i) is generated and transmitted to the pilot station 110. Due to the time delay, however, the pilot station 110 and the FSG 160 have received the remote navigation data 182 of a time prior to t(i); an image of the past scene and navigation data 182 of the time prior to t(i) is presented on the display unit 170 as shown in FIG. 3F. For the purpose of discussion and illustration only and not of limitation, the change in the scene due to ROV's forward progress will be assumed to be negligible.

Referring to FIG. 3G, assume that the pilot continues the right turn at a time equal to t(i) plus a time delay t(d), the time it takes for a one-way transmission of data between the pilot station 110 and the ROV 180, or vice-versa. In response to receiving the time-delayed ECSC data 122 of t(i), the ROV 180 has entered into a level right turn at bank angle of 25 degrees as shown in FIG. 3H. The remote navigation data 182 representative of the flight attitude at t(i)+t(d) is generated and transmitted to the pilot station 110. Due to the time delay, the pilot station 110 and the FSG 160 have received the remote navigation data 182 of t(i); in response, the image of the past scene and navigation data 182 of t(i) indicating the heading of 310 degrees and straight-and-level flight is presented on the display unit 170 as shown in FIG. 3I.

Referring to FIG. 3J, assume that the time is t(i)+2*t(d), and the pilot continues the right turn. In response to receiving the time-delayed ECSC data 122 of t(i)+t(d), the ROV 180 continues its level right turn at bank angle of 25 degrees as shown in FIG. 3K; the change in the terrain is indicative of a change in heading (assumed now to be 320 degrees). The remote navigation data 182 representative of the flight attitude at t(i)+2*t(d) is generated and transmitted to the pilot station 110. Due to the time delay, the pilot station 110 and the FSG 160 have received the remote navigation data 182 of t(i)+t(d); in response, the image of the past scene and navigation data 182 of t(i)+t(d) indicating the heading of 310 degrees and level right turn at bank angle of 25 degrees is presented on the display unit 170 as shown in FIG. 3L, where the synthetic scene of FIG. 3L represents the actual scene outside of the ROV 180 shown in FIG. 3H.

Referring to FIG. 3M, assume that the time is t(i)+3*t(d), and the pilot has completed the right turn and moves the manual control device in a position that places the ROV 180 into a straight-and-level flight with a heading of 340 degrees. In response to pilot's action, the ECSCS 120 generates ECSC data 122 representative of straight-and-level flight. In response to receiving the time-delayed ECSC data 122 of t(i)+2*t(d), the ROV 180 continues its level right turn at bank angle of 25 degrees as shown in FIG. 3N; the change in the terrain is indicative of a change in heading (assumed now to be 330 degrees). The remote navigation data 182 representative of the flight attitude at t(i)+3*t(d) is generated and transmitted to the pilot station 110. Due to the time delay, the pilot station 110 and the FSG 160 have received the remote navigation data 182 of t(i)+2*t(d); in response, the image of the past scene and navigation data 182 of t(i)+2*t(d) indicating the heading of 320 degrees and level right turn at bank angle of 25 degrees is presented on the display unit 170 as shown in FIG. 3O, where the synthetic terrain of FIG. 3O represents the actual scene outside of the ROV 180 shown in FIG. 3K.

Referring to FIG. 3P, assume that the time is t(i)+4*t(d), and the pilot continues straight-and-level flight at a heading of 340 degrees. In response to receiving the time-delayed ECSC data 122 of t(i)+3*t(d), the ROV 180 enters straight-and-level flight as shown in FIG. 3Q; the change in the terrain is indicative of a change in heading (assumed now to be 340 degrees). The remote navigation data 182 representative of the flight attitude at t(i)+4*t(d) is generated and transmitted to the pilot station 110. Due to the time delay, the pilot station 110 and the FSG 160 have received the remote navigation data 182 of t(i)+3*t(d); in response, the image of the past scene and navigation data 182 of t(i)+3*t(d) indicating the heading of 330 degrees and level right turn at bank angle of 25 degrees is presented on the display unit 170 as shown in FIG. 3R, where the synthetic terrain of FIG. 3R represents the actual scene outside of the ROV 180 shown in FIG. 3N.

Referring to FIG. 3S, assume that the time is t(i)+5*t(d), and the pilot continues straight-and-level flight at a heading of 340 degrees. In response to receiving the time-delayed ECSC data 122 of t(i)+4*t(d), the ROV 180 continues its straight-and-level flight as shown in FIG. 3T. The remote navigation data 182 representative of the flight attitude at t(i)+5*t(d) is generated and transmitted to the pilot station 110. Due to the time delay, the pilot station 110 and the FSG 160 have received the remote navigation data 182 of t(i)+4*t(d); in response, the image of the past scene and navigation data 182 of t(i)+4*t(d) indicating the heading of 340 degrees and straight-and-level flight is presented on the display unit 170 as shown in FIG. 3U, where the synthetic terrain of FIG. 3U represents the actual scene outside of the ROV 180 shown in FIG. 3Q.

Figure 4B:
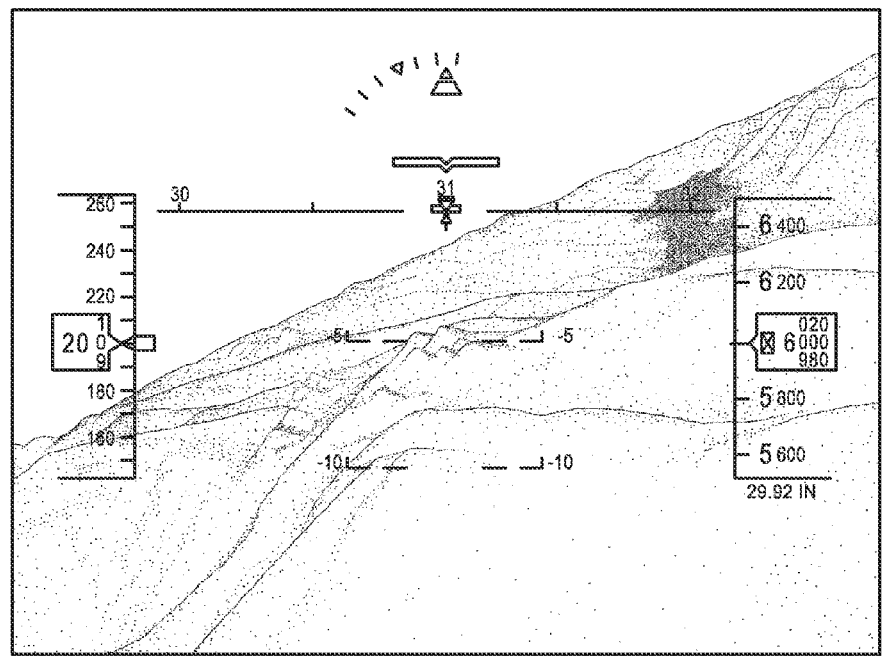
Figure 4C:
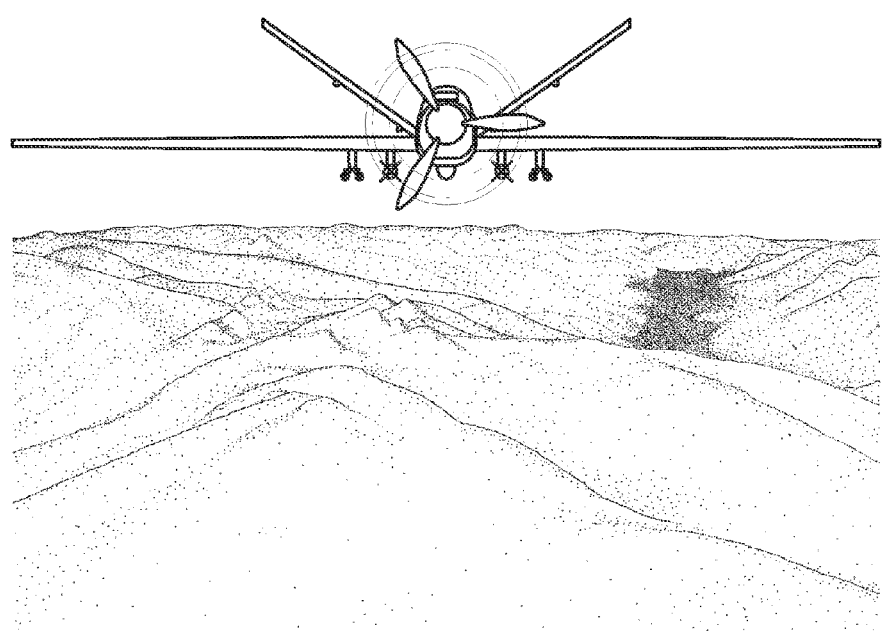
Figure 4H:
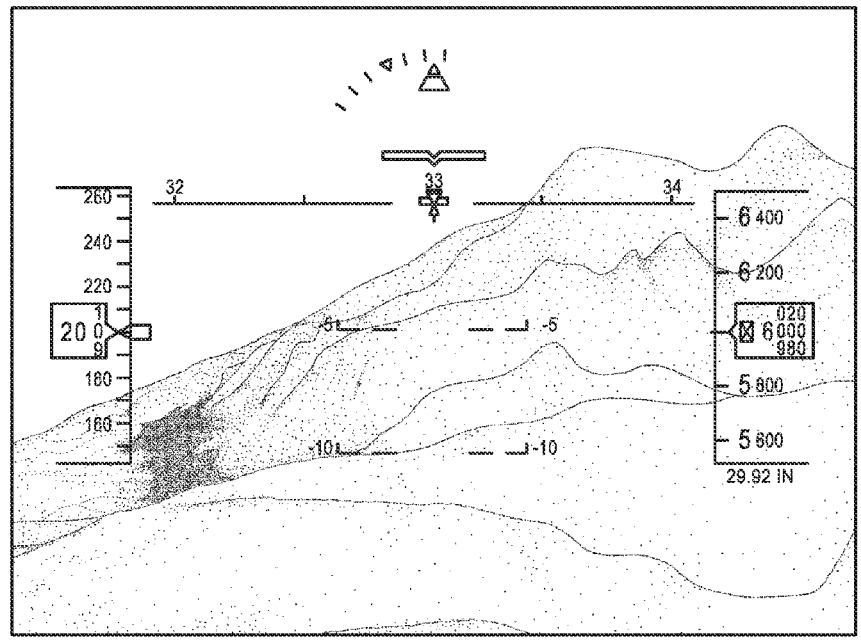
Figure 4I:
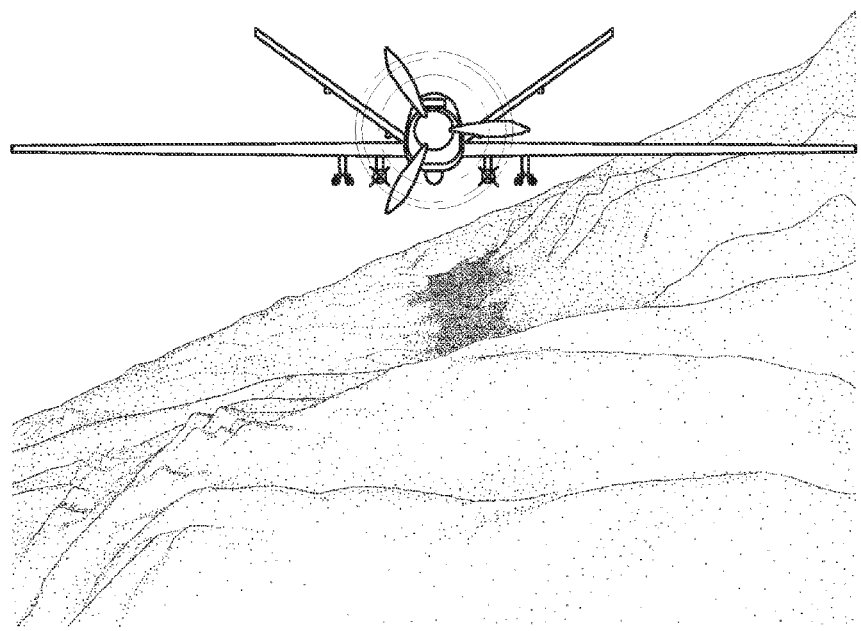
Figure 4N:
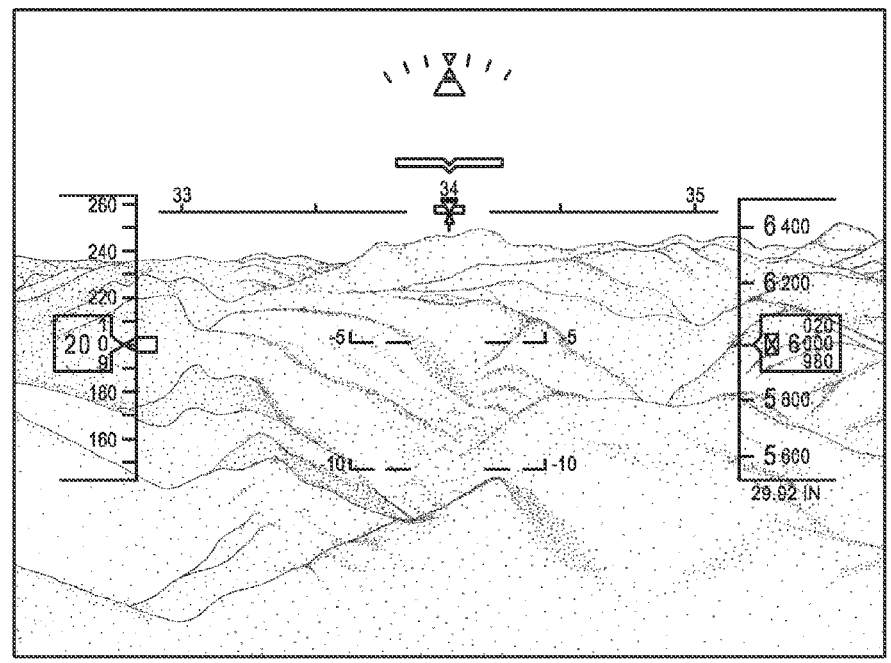
Figure 4O:
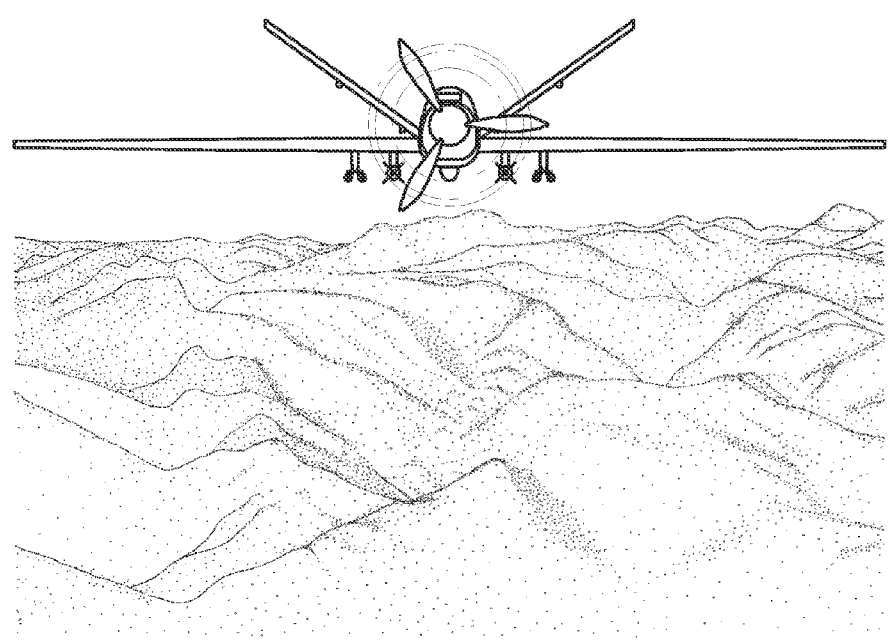

The advantages and benefits of the embodiments discussed herein may be disclosed by illustrating in FIGS. 4A through 4O the generation of a future scene outside the ROV 180. The future scene may be the actual scene at the time when the ROV 180 receives the ECSC data 122, where such time may be equal to the instant time plus the time delay.

Assume that the pilot has placed the ROV 180 in the same scenario as illustrated in FIG. 3A: straight-and-level flight, a heading of 310 degrees, an altitude of 6,000 feet, and a speed of 200 knots. Referring to FIG. 4A, assume that the pilot wishes to change heading to 340 degrees and has moved the manual control device in a position that places the ROV 180 into a level right turn at bank angle of 25 degrees at an initial time t(i). In response to pilot's action, the ECSCS 120 generates ECSC data 122 representative of 25 degree right turn that is ultimately transmitted to the ROV 180 via the datalink 150 and the communication system.

Besides being transmitted to the ROV 180, the ECSC data 122 may be provided to the FSG 160, where the FSG 160 may be programmed to receive not only the ECSC data 122 of t(i) but also the ECSC data 122 during the preceding time period between t(i)−t(d) and t(i). Moreover, as the previous discussion about the time delay illustrates, the pilot station 110 and the FSG 160 have not received the remote navigation data 182 generated at t(i); instead, the remote navigation data 182 generated at t(i)−t(d) may be received by the pilot stations 110 and the FSG 160 at t(i).

As embodied herein, aircraft performance requirements could be factored into the prediction of future navigation data. Aircraft performance requirements include those limitations stated in an aircraft flight manual or pilot's operating handbook that may affect aircraft performance during all phases of flight. Those skilled in the art understand that this aircraft performance may be affected by one or more actual factors such as, but not limited to, temperature, winds aloft, barometric pressure, dew point, wind direction, wind speed, empty weight, center of gravity, weight of fuel, weight of cargo, position and/or operability of flaps and/or slats, spoilers, speed brakes, landing gear, engine performance, air density, and/or the presence or absence of armament. One or more of the actual factors could be provided by the ECSCS 120, the vehicles system 130, and/or the ROV 180. Given an undesirable combination of these factors, the performance of the ROV 180 could be negatively affected.

Aircraft performance algorithms are known to those skilled in the art. Programmed with the performance algorithm(s) of the ROV 180 predicting the performance of the ROV 180 in response to engine and control inputs of the ECSC data 122, the FSG 160 may predict the future navigation data representative of at least the position and heading of the ROV 180 at $t(i)+t(d)$ by applying the ECSC data 122 of $t(i)$ and the preceding time period between $t(i)-t(d)$ and $t(i)$ to the remote navigation data 182 of $t(i)-t(d)$. Based upon the predicted future navigation data, the FSG 160 could retrieve terrain data from the terrain database 140 corresponding to the future navigation data and generate synthetic image data representative of the future scene outside the ROV 180 at $t(i)+t(d)$. When the symbology data corresponding to the future navigation data is generated and added to the synthetic image data, the future scene outside the ROV 180 and the navigation symbology corresponding to the future scene may be presented on the display unit 170 as shown in FIG. 4B; as presented on the display unit 170, the ROV 180 has entered into a level right turn at bank angle of 25 degrees in the future scene of $t(i)+t(d)$.

By presenting the future scene and not either the instant scene or the past scene, a pilot may immediately observe the reaction to his or her moving of the manual control device even though, as discussed above, the ROV 180 will not be responsive to the ECSC data 122 until $t(i)+t(d)$; the actual scene outside of the ROV 180 of $t(i)$ is shown in FIG. 4C.

Referring to FIG. 4D, assume that the time is $t(i)+t(d)$, and the pilot continues the right turn. At time $t(i)+t(d)$, the FSG 160 may receive the ECSC data 122 of $t(i)+t(d)$, the ECSC data 122 of the preceding time period between $t(i)$ and $t(i)+t(d)$, and the remote navigation data 182 of $t(i)$. By applying this ECSC data 122 to this remote navigation data 182, the FSG 160 may predict the future navigation data for $t(i)+2*t(d)$. After retrieving terrain data corresponding to this future navigation data, the FSG 160 may generate synthetic image data and symbology data, from which the future scene and the navigation symbology of $t(i)+2*t(d)$ may be presented on the display unit 170 as shown in FIG. 4E; as presented on the display unit 170, the ROV 180 in the future scene of $t(i)+2*t(d)$ is continuing in its level right turn at bank angle of 25 degrees as it passes through a heading of 320 degrees. As shown in FIG. 4F, the ROV 180 has entered into a level right turn at bank angle of 25 degrees in response to receiving the time-delayed ECSC data 122 of $t(i)$.

Referring to FIG. 4G, assume that the time is $t(i)+2*t(d)$, and the pilot continues the right turn. At time $t(i)+2*t(d)$, the FSG 160 may receive the ECSC data 122 of $t(i)+2*t(d)$, the ECSC data 122 of the preceding time period between $t(i)+t(d)$ and $t(i)+2*t(d)$, and the remote navigation data 182 of $t(i)+t(d)$. By applying this ECSC data 122 to this remote navigation data 182, the FSG 160 may predict the future navigation data for $t(i)+3*t(d)$. After retrieving terrain data corresponding to this future navigation data, the FSG 160 may generate synthetic image data and symbology data, from which the future scene and the navigation symbology of $t(i)+3*t(d)$ may be presented on the display unit 170 as shown in FIG. 4H; as presented on the display unit 170, the ROV 180 in the future scene of $t(i)+3*t(d)$ is continuing in its level right turn at bank angle of 25 degrees as it passes through a heading of 330 degrees. As shown in FIG. 4I, the ROV 180 continues its level right turn at bank angle of 25 degrees in response to receiving the time-delayed ECSC data 122 of $t(i)+t(d)$.

Referring to FIG. 4J, assume that the time is $t(i)+3*t(d)$, and the pilot has completed the right turn and moves the manual control device in a position that will place the ROV 180 into straight-and-level flight with a heading of 340 degrees. At time $t(i)+3*t(d)$, the FSG 160 may receive the ECSC data 122 of $t(i)+3*t(d)$, the ECSC data 122 of the preceding time period between $t(i)+2*t(d)$ and $t(i)+3*t(d)$, and the remote navigation data 182 of $t(i)+2*t(d)$. By applying this ECSC data 122 to this remote navigation data 182, the FSG 160 may predict the future navigation data for $t(i)+4*t(d)$. After retrieving terrain data corresponding to this future navigation data, the FSG 160 may generate synthetic image data and symbology data, from which the future scene and the navigation symbology of $t(i)+4*t(d)$ may be presented on the display unit 170 as shown in FIG. 4K; as presented on the display unit 170, the ROV 180 in the future scene of $t(i)+4*t(d)$ is flying straight-and-level with a heading of 340 degrees. As shown in FIG. 4L, the ROV 180 continues its level right turn at bank angle of 25 degrees in response to receiving the time-delayed ECSC data 122 of $t(i)+2*t(d)$.

Referring to FIG. 4M, assume that the time is $t(i)+4*t(d)$, and the pilot continues straight-and-level flight at a heading of 340 degrees. At time $t(i)+4*t(d)$, the FSG 160 may receive the ECSC data 122 of $t(i)+4*t(d)$, the ECSC data 122 of the preceding time period between $t(i)+3*t(d)$ and $t(i)+4*t(d)$, and the remote navigation data 182 of $t(i)+3*t(d)$. By applying this ECSC data 122 to this remote navigation data 182, the FSG 160 may predict the future navigation data for $t(i)+5*t(d)$. After retrieving terrain data corresponding to this future navigation data, the FSG 160 may generate synthetic image data and symbology data, from which the future scene and the navigation symbology of $t(i)+5*t(d)$ may be presented on the display unit 170 as shown in FIG. 4N; as presented on the display unit 170, the ROV 180 in the future scene of $t(i)+5*t(d)$ is flying straight-and-level with a heading of 340 degrees. As shown in FIG. 4O, the ROV 180 has completed the right turn and returns to straight-and-level flight in response to receiving the time-delayed ECSC data 122 of $t(i)+3*t(d)$.

Figure 5:
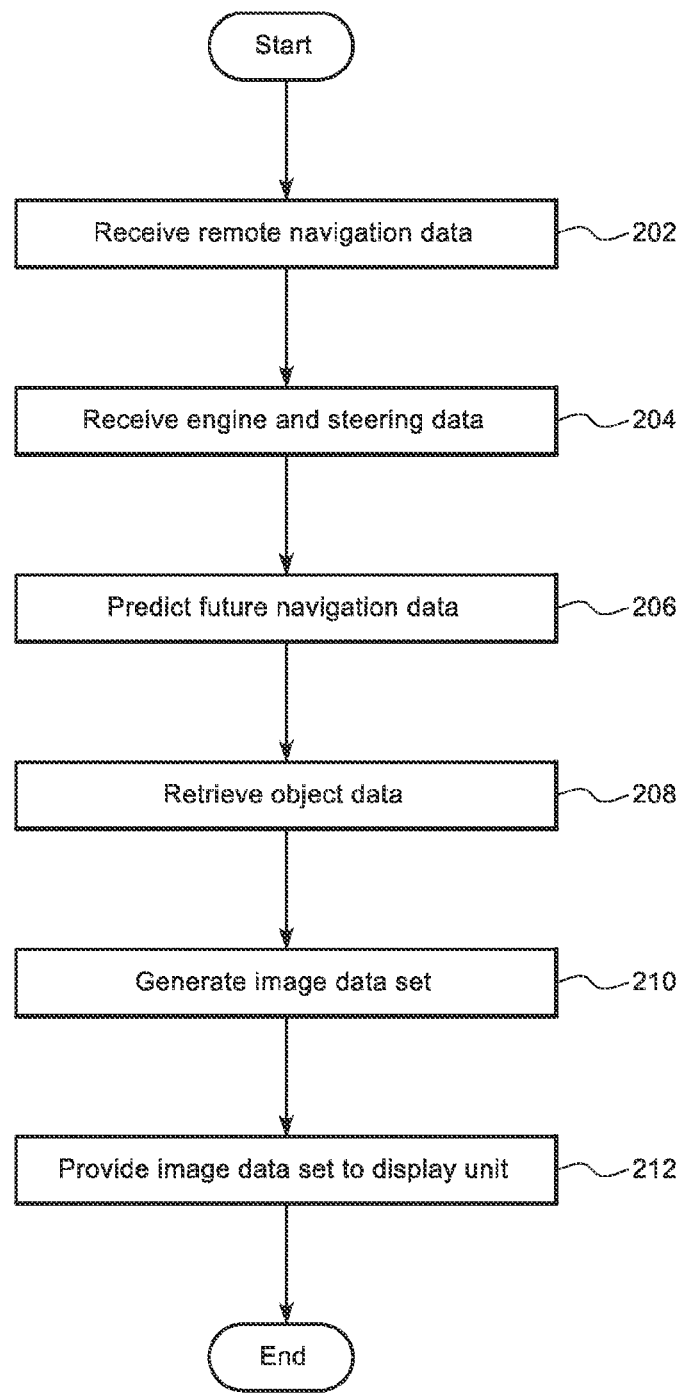
FIG. 5 illustrates a flowchart disclosing an embodiment of a method for generating a future scene of a remotely-operated vehicle.

In an embodiment of FIG. 5, flowchart 200 discloses an example of a method for generating a future scene of a remotely-operated vehicle, where the FSG 160 may be programmed or configured with instructions corresponding to the following modules embodied in the flowchart. Also, the FSG 160 may be a processor of a module such as, but not limited to, a printed circuit board having one or more input interfaces to facilitate the two-way data communications of the FSG 160, i.e., to facilitate the receiving and providing of data. As necessary for the accomplishment of the following modules embodied in the flowchart, the receiving of data is synonymous and/or interchangeable with the retrieving of data, and the providing of data is synonymous and/or interchangeable with the making available or supplying of data.

Flowchart 200 begins in FIG. 5 with module 202 with the receiving of remote navigation data 182 representative of remote navigation information of a remotely-operated vehicle. If the vehicle is a ground vehicle, the remote navigation data 182 could be comprised of position information and/or direction of travel, where the direction of travel may be included if not determined from position information from successive receipts of remote navigation data 182. If the vehicle is an aircraft, the remote navigation data 182 could include orientation information, and the position information and direction of travel information could include altitude and heading, respectively.

The remote navigation data 182 could include time delay information comprised of the time at which the remote navigation data 182 has been transmitted. Alternatively, if not included in the transmission of such data, time delay information could be comprised of data responsive to a transmission from the operator station 110 from which a round-trip time delay may be measured.

The method continues with module 204 with the receiving of ECSC data 122 from one or more sources including the ECSCS 120. If the vehicle is a ground vehicle, the engine control data could correspond to an accelerator, and the steering control data could correspond to forward and/or reverse commands. If the vehicle is an aircraft, the ECSC data 122 could be comprised of flight controls data and engine control data for each engine installed on the ROV 180. One source of steering data could be a flight control system which, in part, provides data representative of surface travel of primary and/or secondary control surfaces, where the amount of surface travel could depend upon the pilot's input of the manual control device and/or input received from a source of autopilot commands. One source of engine control data could be an engine control system configured to provide throttle position information set for one or more engines of the ROV 180, where the throttle position could depend upon the position(s) of the throttle as selected by the pilot and/or set by a source of autopilot commands. As embodied herein, the ECSCS 120 could be combined into one system.

The method continues with module 206 with the predicting of future navigation data. The remote navigation data 122 of a previous time and the ECSC data 122 of the current time and/or the time period between the previous time and the current time may be applied to a performance algorithm(s) to predict the future navigation data of the remotely-operated vehicle at a future time commensurate with the time delay. For example, the future time could be equal to the sum of the current time and difference between the current time and the previous time.

The method continues with module 208 with the retrieving of object data corresponding to the future navigation data. The object data could be representative of information corresponding to terrain, obstacles, and/or surface features. Information corresponding to the position, direction of travel, and/or orientation represented in the future navigation data may be used when determining the scene outside the vehicle and the terrain to be presented therein.

The method continues with module 210 with the generating of an image data set based upon the future navigation data and the terrain data. As embodied herein, the image data set could be comprised of an image comprised of a three-dimensional perspective of scene located outside the vehicle at the future time. In an additional embodiment, symbology data representative of symbology corresponding to the future navigation data could be generated.

The method continues with module 212 with the providing of the image data set to a display unit configured to receive such data and present the image represented in such data on the screen of the display unit; that is, present a three-dimensional image of a scene located outside the vehicle at the future time on the screen of the display unit. In an additional embodiment, the symbology data could be provided to the display unit and overlaid against the future scene outside the remote vehicle. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for generating a future scene of a remotely-operated vehicle ("ROV"), such system comprising:
    an ROV configured to
        generate remote navigation data representative of latitude, longitude, altitude, pitch, roll, and heading of the ROV, and
        transmit the remote navigation data represented in a remote navigation signal;
    at least one source of engine control and steering control ("ECSC") data other than the ROV;
    a datalink configured to receive the remote navigation signal and transmit ECSC data from the at least one source ECSC data to the ROV;
    an immediately-accessible source of object data communicatively independent from the datalink;
    a future scene generator configured to
        receive the remote navigation data,
        receive ECSC data representative of engine and steering commands that, in response to receiving engine and steering commands input, has been generated and transmitted to the ROV via the datalink, where the ECSC data is comprised of engine control data of at least one engine and flight controls data,
        predict future navigation data as a function of
            the remote navigation data,
            the ECSC data, and
            a time delay based upon at least a previous time at which the remote navigation data is transmitted from the ROV, where
                the future navigation data is represented of future latitude, future longitude, future altitude, future pitch, future roll, and future heading,
        retrieve object data based upon the predicted future navigation data,
        generate an image data set based upon the predicted future navigation data and the object data, where
            the image data set is representative of an image of a three-dimensional perspective of a future scene located outside the ROV, where
                the three-dimensional perspective is indicative of at least future ROV pitch and roll orientations represented in the predicted future navigation data, and
        provide the image data set to a display unit; and
    the display unit configured to
        receive the image data set, and
        present the image represented in the image data set, whereby
            the future scene outside the ROV is observed in current time.

2. The system of claim 1, wherein the ROV is an unmanned aerial vehicle.

3. The system of claim 1, wherein the engine and steering commands are commands that have been generated during a period of time.

4. The system of claim 3, wherein
the time delay is further based upon a current time,
the period of time is based upon the previous time at which the remote navigation data is transmitted from the ROV and the current time, or
both the time delay is further based upon the current time, and the period of time is based upon the previous time at which the remote navigation data is transmitted from the ROV and the current time.

5. The system of claim 1, further comprising:
at least one vehicle system other than each source of ECSC data, where each vehicle system is configured to provide at least one performance factor to the future scene generator; and
the future scene generator is further configured to
receive at least one performance factor from each vehicle system, and
include each performance factor in the prediction of the future navigation data.

6. The system of claim 1, wherein
the future scene generator is further configured to
generate symbology data representative of symbology corresponding to the future navigation data, and
provide the symbology data to the display unit; and
the display unit is further configured to
receive the symbology data, and
overlay the symbology represented in the symbology data against the future scene outside the ROV.

7. The system of claim 1, further comprising:
an operator station comprised of
the datalink,
each source of ECSC data,
the future scene generator, and
the display unit.

8. The system of claim 7, wherein
the operator station is
a fixed ground station,
a mobile ground station,
a nautical station, or
an aerial station.

9. A device for generating a future scene of a remotely-operated vehicle ("ROV"), such device comprising:
a future scene generator configured to
receive remote navigation data representative of latitude, longitude, altitude, pitch, roll, and heading of an ROV via a datalink;
receive engine control and steering control ("ECSC") data representative of engine and steering commands that, in response to receiving engine and steering commands input, has been generated and transmitted to the ROV via a datalink, where
the ECSC data is comprised of engine control data of at least one engine and flight controls data;
predict future navigation data as a function of
the remote navigation data,
the ECSC data, and
a time delay based upon at least a previous time at which the remote navigation data is transmitted from the ROV, where
the future navigation data is represented of future latitude, future longitude, future altitude, future pitch, future roll, and future heading;
retrieve object data based upon the predicted future navigation data from an immediately-accessible source of object data communicatively independent from the datalink;
generate an image data set based upon the predicted future navigation data and the object data, where
the image data set is representative of an image of a three-dimensional perspective of a future scene located outside the ROV, where
the three-dimensional perspective is indicative of at least future ROV pitch and roll orientations represented in the predicted future navigation data; and
provide the image data set to a display unit, such that the image represented in the image data set is presented, whereby
the future scene outside the ROV is observed in current time.

10. The device of claim 9, wherein the ROV is an unmanned aerial vehicle.

11. The device of claim 9, wherein the engine and steering commands are commands that have been generated during a period of time.

12. The device of claim 11, wherein
the time delay is further based upon a current time,
the period of time is based upon the previous time at which the remote navigation data is transmitted from the ROV and the current time, or
both the time delay is further based upon the current time, and the period of time is based upon the previous time at which the remote navigation data is transmitted from the ROV and the current time.

13. The device of claim 9, wherein
the future scene generator is further configured to
receive at least one performance factor from at least one vehicle system, and
include each performance factor in the prediction of the future navigation data.

14. The device of claim 9, wherein
the future scene generator is further configured to
generate symbology data representative of symbology corresponding to the future navigation data, and
provide the symbology data to the display unit, whereby
the symbology represented in the symbology data is overlaid against the future scene outside the ROV.

15. A method for generating a future scene of a remotely-operated vehicle ("ROV"), such method comprising:
receiving remote navigation data representative of latitude, longitude, altitude, pitch, roll, and heading of an ROV via a datalink;
receiving engine control and steering control ("ECSC") representative of engine and steering commands that, in response to receiving engine and steering commands input, has been generated and transmitted to the ROV via a datalink, where
the ECSC data is comprised of engine control data of at least one engine and flight controls data;
predicting future navigation data as a function of
the remote navigation data,
the ECSC data, and
a time delay based upon at least a previous time at which the remote navigation data is transmitted from the ROV, where
the future navigation data is represented of future latitude, future longitude, future altitude, future pitch, future roll, and future heading;

retrieving object data based upon the predicted future navigation data from an immediately-accessible source of object data communicatively independent from the datalink;

generating an image data set based upon the predicted future navigation data and the object data, where
- the image data set is representative of an image of a three-dimensional perspective of a future scene located outside the ROV, where
  - the three-dimensional perspective is indicative of at least future ROV pitch and roll orientations represented in the predicted future navigation data; and providing the image data set to a display unit, such that the image represented in the image data set is presented, whereby
- the future scene outside the ROV is observed in current time.

16. The method of claim 15, wherein the ROV is an unmanned aerial vehicle.

17. The method of claim 15, wherein the engine and steering commands are commands that have been generated during a period of time.

18. The method of claim 17, wherein
the time delay is further based upon a current time,
the period of time is based upon the previous time at which the remote navigation data is transmitted from the ROV and the current time, or
both the time delay is further based upon the current time, and the period of time is based upon the previous time at which the remote navigation data is transmitted from the ROV and the current time.

19. The method of claim 15, further comprising:
receiving at least one performance factor from at least one vehicle system, and
including each performance factor when predicting the future navigation data.

20. The method of claim 15, further comprising:
generating symbology data representative of symbology corresponding to the future navigation data, and
providing the symbology data to the display unit, whereby the symbology represented in the symbology data is overlaid against the future scene outside the ROV.

* * * * *